US009876730B1

(12) United States Patent
Ward

(10) Patent No.: US 9,876,730 B1
(45) Date of Patent: Jan. 23, 2018

(54) VIRTUALIZED INSTANCE SELECTION

(71) Applicant: Amazon Technologies, Inc., Reno, NV (US)

(72) Inventor: Miles Julian Ward, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 614 days.

(21) Appl. No.: 14/015,962

(22) Filed: Aug. 30, 2013

(51) Int. Cl.
H04L 29/08 (2006.01)
H04L 12/911 (2013.01)

(52) U.S. Cl.
CPC .................................. H04L 47/70 (2013.01)

(58) Field of Classification Search
CPC ......... H04L 47/70; H04L 67/02; H04L 67/30; H04L 47/82; H04L 47/78
USPC .......................................................... 709/226
See application file for complete search history.

(56) References Cited

U.S. PATENT DOCUMENTS

| 5,155,835 | A  | * | 10/1992 | Belsan | G06F 3/0601 |
|  |  |  |  |  | 711/113 |
| 5,403,639 | A  | * | 4/1995 | Belsan | G06F 17/30067 |
| 8,239,229 | B1 | * | 8/2012 | Paiz | G06Q 10/083 |
|  |  |  |  |  | 705/7.11 |
| 8,607,067 | B1 | * | 12/2013 | Janse van Rensburg | H04L 63/0823 |
|  |  |  |  |  | 713/189 |
| 8,627,195 | B1 | * | 1/2014 | Hayden | G06F 17/30873 |
|  |  |  |  |  | 715/229 |
| 8,683,560 | B1 | * | 3/2014 | Brooker | G06F 21/44 |
|  |  |  |  |  | 713/155 |
| 2004/0243534 | A1 | * | 12/2004 | Culter | G06F 9/4411 |
| 2009/0276771 | A1 | * | 11/2009 | Nickolov | G06F 9/4856 |
|  |  |  |  |  | 717/177 |
| 2009/0300528 | A1 | * | 12/2009 | Stambaugh | G06F 3/04817 |
|  |  |  |  |  | 715/764 |
| 2011/0093726 | A1 | * | 4/2011 | Worthington | G06F 1/3225 |
|  |  |  |  |  | 713/320 |
| 2011/0214067 | A1 | * | 9/2011 | Tanaka | G06F 17/243 |
|  |  |  |  |  | 715/745 |
| 2011/0299550 | A1 | * | 12/2011 | Karaoguz | G06Q 20/10 |
|  |  |  |  |  | 370/401 |
| 2012/0185529 | A1 | * | 7/2012 | Shimamoto | G06F 9/5072 |
|  |  |  |  |  | 709/203 |
| 2013/0036249 | A1 | * | 2/2013 | Angaluri | G06F 9/45558 |
|  |  |  |  |  | 711/6 |
| 2013/0085892 | A1 | * | 4/2013 | Golden | G06Q 30/06 |
|  |  |  |  |  | 705/26.62 |
| 2013/0232172 | A1 | * | 9/2013 | Wood | G06F 17/30985 |
|  |  |  |  |  | 707/780 |
| 2014/0010171 | A1 | * | 1/2014 | Morrill | H04W 48/18 |
|  |  |  |  |  | 370/329 |
| 2014/0074850 | A1 | * | 3/2014 | Noel | G06F 11/0709 |
|  |  |  |  |  | 707/741 |
| 2015/0040127 | A1 | * | 2/2015 | Dippenaar | G06F 9/4856 |
|  |  |  |  |  | 718/1 |
| 2015/0043378 | A1 | * | 2/2015 | Bardgett | H04L 41/12 |
|  |  |  |  |  | 370/254 |

* cited by examiner

Primary Examiner — Tu Nguyen
(74) Attorney, Agent, or Firm — Thorpe North & Western, LLP.

(57) ABSTRACT

A technology to select a virtualized instance is described. A computing specification is received. The computing specification is mapped to specifications of a virtualized instance. Information about the virtualized instance is provided as a result.

22 Claims, 9 Drawing Sheets

VIRTUALIZED INSTANCE SELECTION

BACKGROUND

Virtualized computing services are a way to reduce computing costs and/or provide a more robust computing environment. Using virtualized computing services, a customer may be able to purchase computing resources for a given period of time, for example. Moreover, a virtualized computing service provider may provide a service level agreement (SLA) guaranteeing a certain level of reliability. While virtualized computing services have been available for some time, virtualized computing service implementations have adjusted with changing technology.

With the advent of the Internet, the access of computing resources over a network has given rise to the notion that computational power may become increasingly similar to a utility. Browsers, for instance, may be implemented with reduced computational resources, while servers providing pages to such browsers may be configured to perform more complex computational processes in generating such pages. In this way, more compute intensive processing may take place somewhere in the network away from a client device, while the local processing on the client device may be simply rendering the results delivered over the network, for example. Transcoding, optical character recognition (OCR), voice recognition and web services are just a few examples of computational applications that may be provided as a service somewhere on a network with a utility-like interface.

DETAILED DESCRIPTION

A virtual machine instance selection technology is described that may allow a customer to more easily select virtualized computer instances that fit the customer's needs. As customers and organizations move some computational resources to a virtualized computing service that is accessible via a network (e.g. Internet), a customer may often find it difficult to evaluate which computing resources the customer should select to meet desired computing specifications (e.g., hardware or software specifications). For example, a customer may host a database application on a certain physical computer make and model with specific subsystem configurations. When evaluating whether the database application might be more effectively (e.g. economically, securely, reliably, etc.) provided by a virtualized computing service accessible over a network, the customer may want to know what type of virtualized instance is roughly equivalent to the computer make and model that the database application is currently being hosted on. The terms virtualized instance, virtualized computer instance and virtual machine instance may be used interchangeably in this description.

In another example, a virtualized instance may be based on the type of software that it is expected to run. Software specifications, such as minimum system requirements or ideal system requirements, may be used to select a desirable size and configuration of a virtualized instance. Additionally, some software may have recommended requirements for a particular load for the software. These recommended load requirements may also be used to select a desirable size and configuration of a virtualized instance.

The virtual machine instance selection technology may take several forms. For instance, an interface providing a text box for free-form description may be used in one example implementation. Upon receiving a free-form description from a customer, the free-form description may be transformed into computer specifications. This transformation may take place, for example, through parsing the free-form text, applying regular expression matching, or through any sort of natural language processing technique. These computer specifications may then be mapped to specifications of a virtual machine instance. One example way the computer specifications may be mapped is on a component-by-component basis (e.g. central processing unit (CPU) to CPU, memory to memory, storage to storage, etc.). Thus the technology may allow customers to align known computing resources to more abstracted labels for virtualized network computing resources. Alternatively, the customers may identify a virtual machine instance based on desirable aggregate computing power or computing resources used to efficiently execute a software package.

Figure 1:
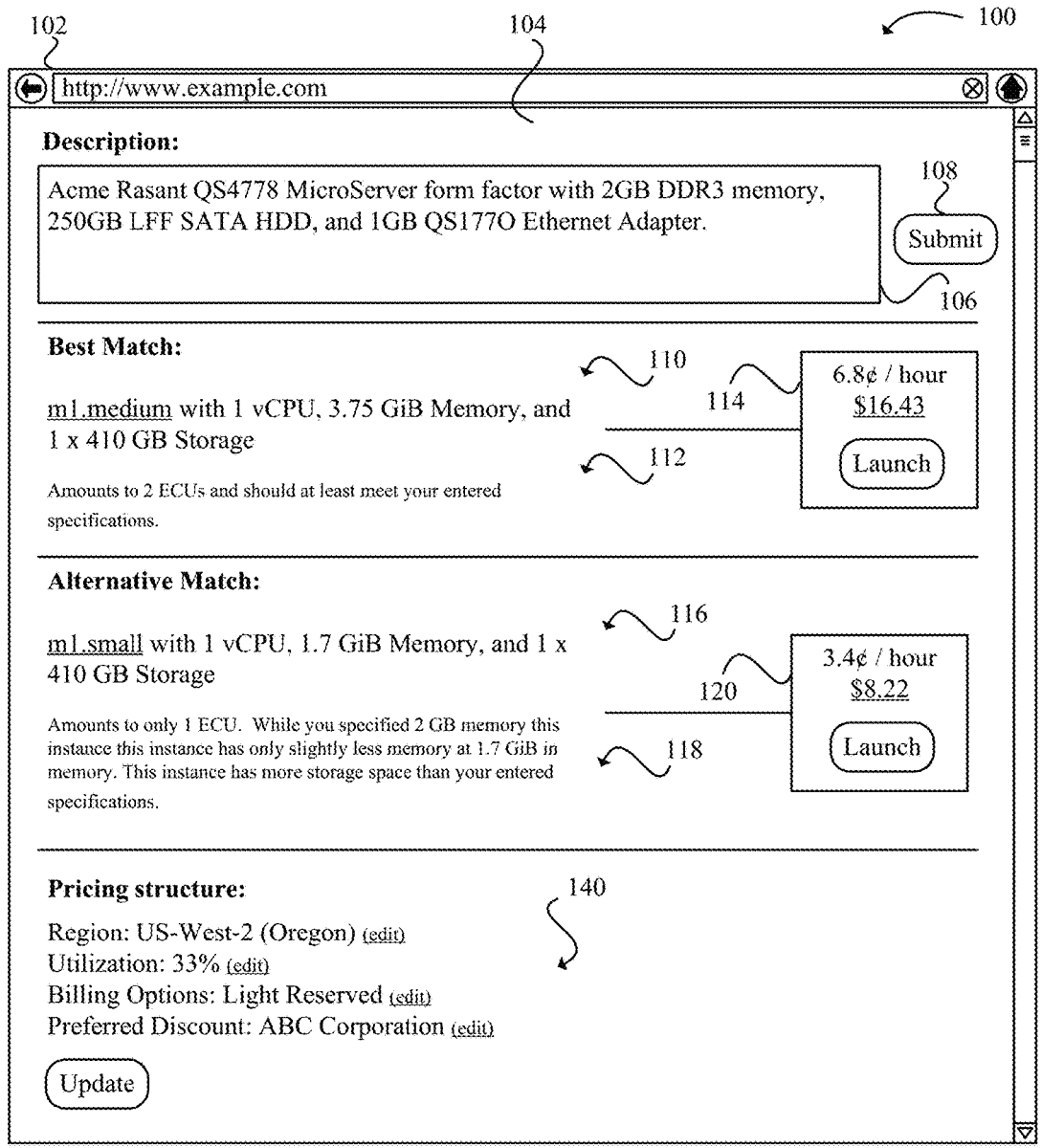
FIG. 1 illustrates an example of a customer interface for virtualized instance selection using a free-form description of computer hardware.

To more clearly describe the technology, examples are now provided with reference to the figures. FIG. 1 illustrates an example of a customer interface 100 for virtualized instance selection or identification using a free-form description of computer hardware. In particular, the customer interface 100 may include a browser 102 with a page 104 displayed therein. The page 104 may include a text box 106 that allows a customer to enter a free-form description of computer hardware. The free-form description may be copied from an information source such as an electronic page or typed in by the customer.

In the depicted case, the customer has entered a particular make and model, namely an "Acme Rasant QS4778." For illustrative purposes, Acme may be understood to be the manufacturer of the Rasant model. As many computer models have various customizable components, QS4778 may be a sub-model of the Acme Rasant line of computers. Additionally, the customer may have entered a particularized hardware description into the text box, presumably of the Acme Rasant QS4778. For example, the customer may have specified 2 gigabytes (GB) of double data rate type three (DDR3) memory, a 250 GB large form factor (LFF) hard disk drive (HDD), and a 1 GB Ethernet adapter model number QS1770.

After providing the description in the text box 106, the customer may press the submit button 108. At this point, if the description in the text box 106 is invalid or otherwise meaningless, the page 104 can notify the customer that the description in the text box 106 could not be understood. For example, the description in the text box 106 may be contradictory or may not relate to any computer or machine specifications. Additionally, the page 104 may assist the customer in providing a valid description by identifying portions of the input that may be valid and other portions of the text input that may be considered invalid or indecipherable. Alternatively, the interface 100 may forward the customer to a structured input page. Such a structured input page, for example, may ask for a computer make, model, and then sub-model. Or, such a structured input page may request that the customer select hardware component parts for evaluation in selecting a virtualized instance.

Assuming the description in the text box 106 is valid, the free-form description may be transformed into computer specifications. This transformation may take place in part through parsing the free-form text, for example. Other transformation methods may include applying regular expression matching, or using natural language processing.

As depicted, the description in the text box 106 is valid and has returned a desirable match 110 and an alternative match 116 for a virtualized computing instance. A desirable match 110 may be described as an m1.medium type of virtualized computer instance with 1 vCPU, 3.75 gigabytes (GB) memory and 1 HDD with 410 GB storage capacity. The m1.medium label may represent a list of virtualized hardware specifications that form the virtualized computer instance. As another example of a virtualized instance type, a c1.xlarge virtualized instance type may include 8 vCPUs, 7 GB of virtual memory and 4 HDDs of 420 GB of virtual storage each.

A notation 112 for the desirable or viable match 110 may explain that the m1.medium amounts to 2 elastic compute units (ECUs) or resizable computing resources. In addition, the viable match may at least meet the computing capacity entered using the specification, namely the Acme Rasant QS4778. More particularly, the m1.medium instance may have at least the same computation resources as the Acme Rasant QS4778.

The page 104 may also provide a pricing and launch button in a box 114. In this way a customer may be able to see potential costs related with the recommended virtualized computer instance. Cost information in the box 114 may be presented in various ways including, hourly, monthly or annually. For instance, as depicted, an hourly price is shown along with an annual price of $16.43. Using the button in the box 114, the customer may easily purchase and launch the recommended virtualized computer instance. When the virtualized computer instance is launched, the virtualized computer instance may begin executing within a virtualization environment and provide the computing resources or services that are specified to be associated with the virtualized computer instance.

The page 104 may also provide an alternative match 116 for a viable virtualized computer instance. An alternative match, for instance, may be close to the entered specifications, namely the Acme Rasant QS4778 computer model, but may fall short of surpassing all of the performance ratings for components that were specified by the customer. For example, an m1.small type of virtualized computer instance specified in the alternative match 116 may have 3.75 GB memory, while the Acme Rasant QS4778 has 2 GB memory. However, the m1.small may be over provisioned in storage as compared to customer supplied hardware request with 410 GB as compared to 250 GB of storage for the Acme Rasant QS4778.

Similar to the best match 110, the alternative match 116 may include a notation 118 and a box 120 containing cost information and a launch button. The launch button may be a link that launches the associated virtualized computer instance, as described earlier. The notation 118 may note the differences between entered specifications and alternative match 116.

Cost information in the boxes 114 and 120 may be presented in various ways including, hourly, monthly or annually. A pricing structure 140 may be used in determining the prices displayed in the boxes 114 and 120. For instance, hourly pricing may be based in part upon a region in which the virtualized computer instance is to be run. Moreover, the pricing structure may include various billing options or preferred discounts. Furthermore, monthly or annual calculated costs may depend on utilization of the virtualized computer instance. If a virtualized machine is only running during normal business hours, for example, those business hours may be billed. The amount $16.22 and $8.22, respectively in the boxes 114 and 120, for instance may show a 33% utilization. Thus, a cost calculator may be provided for one or more virtualized instance types.

By receiving a free-form description of computer hardware in the text box 106, a virtualized computing instance may be identified by transforming the free-form description into computer specifications. Computer specifications may then be mapped to specifications of a virtualized computer instance, and a description (e.g. the best match 110, over the alternative match 116) of the virtualized computer instance can be provided back to a customer as a result. In another example, a free-form description may include a software specification. In this case, the virtualized computer instance may be based on the type of software that the virtualized computer instance is expected to run by employing a minimum system requirement or desired system requirement to select a desirable size and configuration of a virtualized computer instance. Software load recommended specification for a particular load on the software may also be used to select a desirable size and configuration of a virtualized computer instance. For instance, a customer may specify that a 10 terabyte (TB) database needs to be run on a virtualized computer instance. By specifying "10 TB database", the technology may provide a virtualized computer instance with an appropriate configuration.

Figure 2:
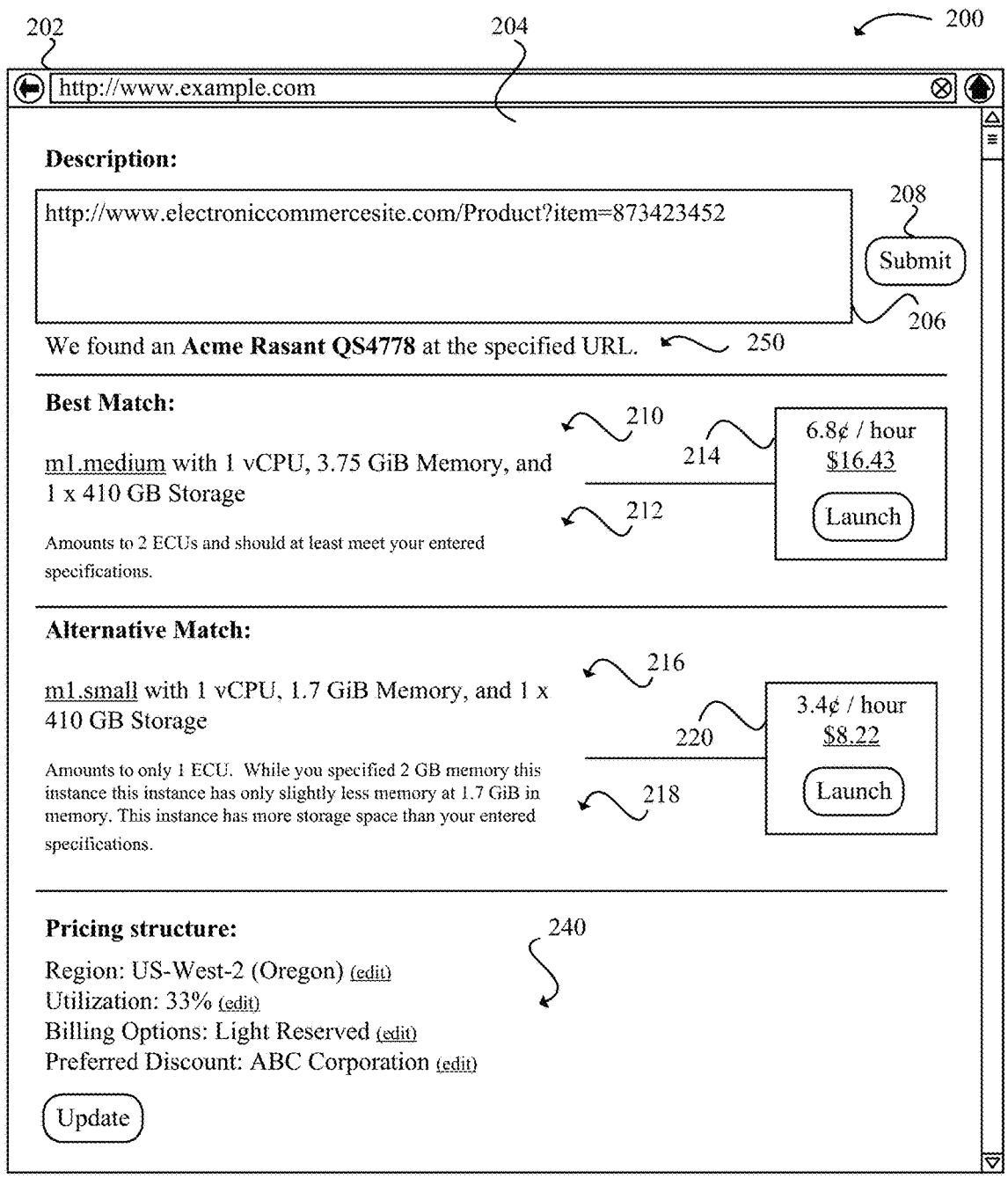
FIG. 2 illustrates an example of a customer interface for virtualized instance selection using a uniform resource locator (URL) of a page describing computer hardware.

FIG. 2 illustrates an example of a customer interface 200 for virtualized instance selection using a uniform resource locator (URL) of a page describing computer hardware. As is similar to the customer interface 100, the customer interface 200 includes a browser 202 and a page 204. The page 204 may include or be structured in a manner that is similar to or compatible with the page 104. Indeed, the pages 104 and 204 may be the resultant pages of a common page. For instance, the contents of an input box, such as the text boxes 106 and 206, may determine whether the page 104 or 204 is generated. More particularly, if the box 206 contains a free-form uniform resource locator (URL) description, the free-form URL description may link to a page containing a free-form description of the machine. The technology may retrieve the page describing the computer hardware when a user clicks the submit button 208, and after processing the page describing the computer hardware, the technology may find an Acme Rasant QS4778 as depicted by a URL processing result 250.

The URL processing result 250 may then be used as a computing specification. In this way, a computer or other type of machine may be specified by way of a third-party URL to the system. The computing specification may be mapped to specifications of a virtualized instance. For instance, page 204 includes a best match 210 and an alternative match 216. The customer may be informed of the virtualized instance as a result of the mapping. Further, the best match 210 and the alternative match 216 may respectively have notations 212 and 218 along with boxes 214 and 220 containing cost information and a launch button. Likewise a pricing structure 240 may be used in part as a calculation basis to determine the prices displayed in the boxes 214 and 220. For example, the box 214 may specify a 6.80 hourly cost and calculate a $16.43 annual cost as 33% utilization according to the price structure 240.

In addition to hardware specifications, the computing specification may include a software description. So, a virtualized instance may be mapped that has the same or similar software loaded thereon. Further, the virtualized instance may also be mapped to a software description based on the specifications desired to efficiently execute the software description on the virtualized instance. For example, a virtualized instance may be launched pre-loaded with an operating system (OS). The OS may be specified through mapping a computing specification, including the OS, to specifications of a virtualized instance. In addition to an OS, other software may be specified such as server software, web server software, database software, scripting software (e.g., PHP), virtual machine environments (e.g., Java programming language), computer aided drafting software, word processing software, or any other type of software that may be loaded on a computing machine.

Figure 3:
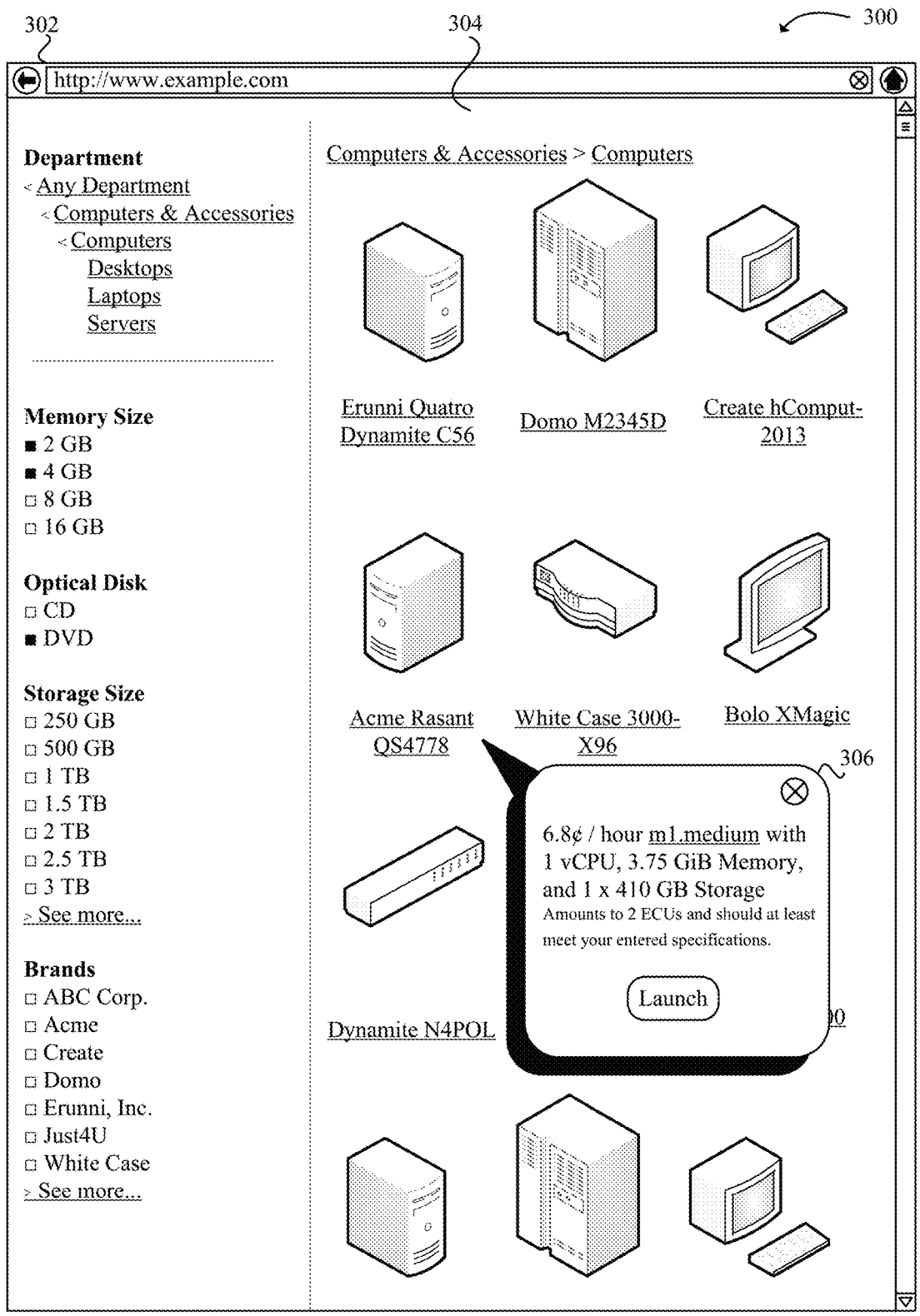
FIG. 3 illustrates an example browser plug-in customer interface for virtualized instance selection on a page.

FIG. 3 illustrates an example browser plug-in customer interface 300 for virtualized instance selection on a page 304. In particular, the example browser plug-in customer interface 300 may include a browser 302 with the page 304 rendered therein. The browser 304 may have a plug-in that may selectively operate with components on the page 304. As depicted, the browser plug-in may operate on a text component of the page 304 containing the text "Acme Rasant QS4778". Using this text, the browser plug-in may recognize that the text is a specific computer make and model, and accordingly may map the computer make and model to specifications for a virtualized instance and display the virtualized instance as depicted in a pop-up 306. Similar to the examples in FIGS. 1 and 2, the example browser plug-in customer interface 300 may provide a link to launch the virtualized instance, as is depicted in the pop-up 306.

In getting the computing specification from the text, a free-form description of the machine may be parsed into the computing specification. In addition to the text "Acme Rasant QS4778," the browser plug-in may also follow a link, employ optical character recognition on an image, or use image object recognition in order to get a computing specification. As a more specific example, the text may be extracted from visible page or text may also be extracted from a linked page without a customer actually visiting a details page for the computing device. The processing associated with getting the computing specification may occur locally with the browser plug-in, or may be assigned to other computers such as a server.

In another implementation, the information illustrated in the pop-up 306 may be provided as an in-text keyword advertisement. A site hosting the page 304 may insert a script into the page 304 which may send a query for a specific computer make and model when it is hovered over. The query may recognize that the query text is a specific computer make and model, and accordingly may map the computer make and model to specifications for a virtualized instance and display the virtualized instance as depicted in a pop-up 306. In this way, the pop-up 306 may be one way to provide an advertisement using the technology. In addition to the browser plug-in and the in-text key word advertisement, other techniques may be used to effectuate the insertion or display of relevant virtualized instances on a page and provide the user with ready results.

Figure 4:
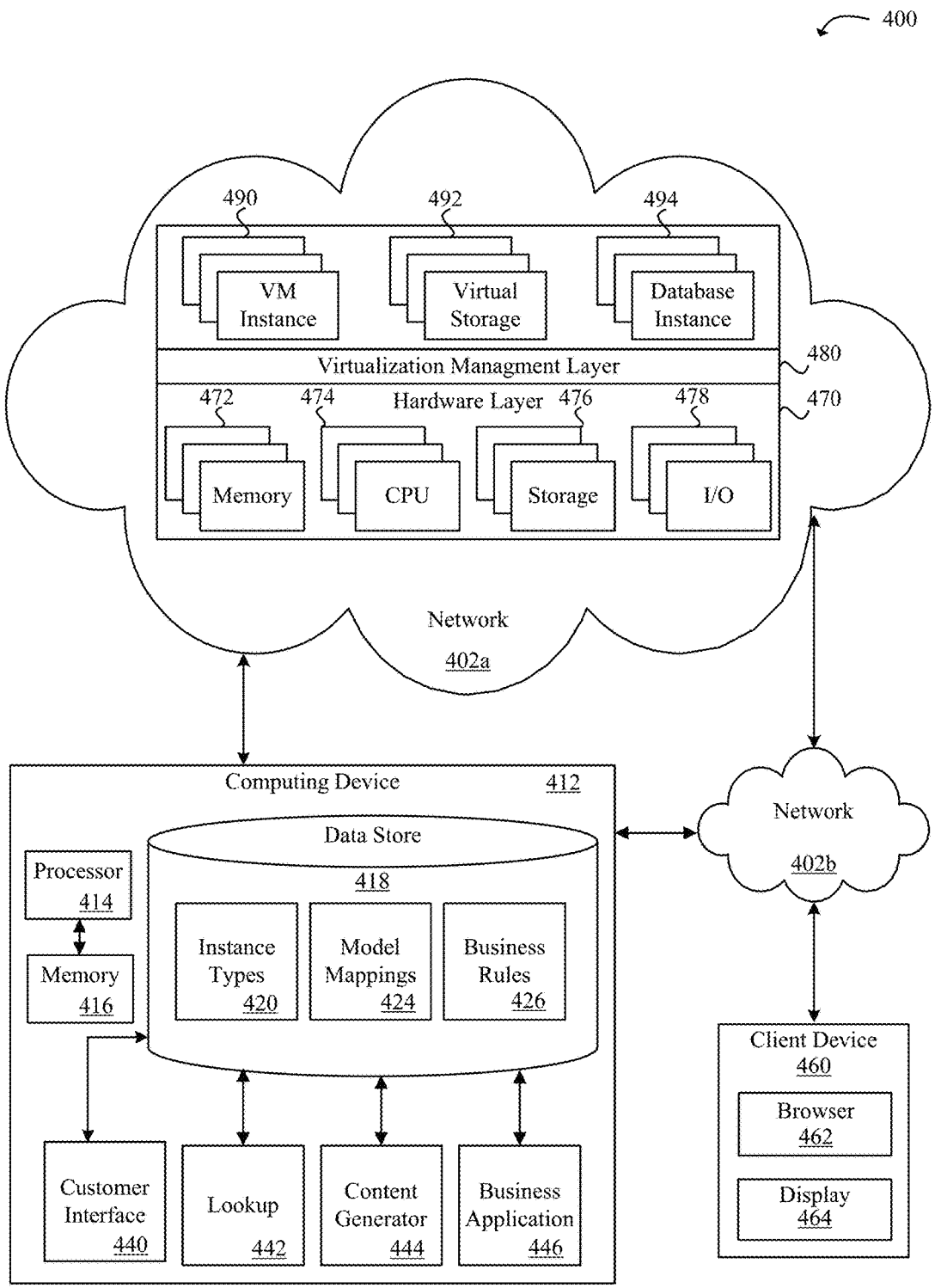
FIG. 4 is a component block diagram illustrating an example system to select a virtualized instance.

FIG. 4 is a component block diagram illustrating an example system 400 to select a virtualized instance 490 or a node in the virtualized system. The system 400 may be used to implement the functionality heretofore described with reference to FIGS. 1-3 or other exemplary functionality discussed below, including functionality described with reference to FIGS. 5-9. The system 400 may include one or more computing devices 412, client devices 460 and hardware layers 470 for the virtualized computing environment.

The hardware layer 470 may be a portion of a virtualized computer instance residing in a network 402a connected to the computing device 412 and/or the client device 460. Alternatively, the computing device 412 may connect through another network 402b such as the Internet. The computing device 412 may be a server used to serve pages to devices which may be used to render and view served pages.

The hardware layer of the virtualized computing environment may include various hardware components such as memory 472, CPUs 474, storage mediums 476 or various input/output (I/O) modules 478. Further, the hardware layer may have a virtualized management layer 480 that runs on or across the hardware layer 470. The virtualized management layer 480 may be a piece of computer software, firmware or hardware, or various combinations thereof, that create and execute virtual machines or services on the hardware layer. Accordingly, multiple virtual machine instances 490 may be run on top of the virtualization management layer 480. The specifications of the virtualized instance may include a virtualized processor architecture, an amount of virtualized compute units, an amount of virtualized processors, an amount of virtualized memory, an amount of virtualized storage space, or a virtualized network input/output (I/O) performance. Additionally, other virtualized services may be run on top of the virtualization management layer 480 such as, for example, virtual storage instances 492 or virtual database instances 494.

The computing device 412 may include a data store 414 having various information stored therein. Additionally, the computing device 412 may include various modules such as a customer interface module 440, a lookup module 442, a content generator module 444, a business application module 446 and other modules to implement functionality described herein.

The customer interface module 440 may accept input of a computing specification. A computing specification may be machine specifications or software specifications. The set of machine specifications, for example, may include references to a processor architecture, a processor speed, an amount of processors, an amount of memory, an amount of storage space, a network input/output (I/O) performance or other machine specifications. The customer interface module 440 therefore may include components such as an HTTP server, for instance, to receive the computing specification. The customer interface 440 may also be used to check the validity of the input, parse the input and format the input for the lookup module 442.

The lookup module 442 may map the computing specification to a virtualized instance by performing a table lookup using the machine specification to find at least one virtualized instance using the computing specification. The lookup module may use, for example, data in a model mappings data store 424 which may contain listings of computer makes and models as they map to virtualized instances. Further, the lookup module may use data in an instance types data store 420 which may contain listings of virtualized instance specifications that may be joined to the data in the model mappings data store 424. In this way, the lookup module may be able to match specifications component-by-component with the computing specification. Alternatively, the lookup module may map the machine specifications as a group to at least one virtualized instance.

The content generator module 444 may receive and use the results of the lookup module 442 to provide a description of the virtualized instance as a result to the computing specification received. The content generator module 444 may be used in conjunction with a business application module 446 to generate customized content. For example, the business application module may apply business rules, such as preferred customer discounts. In this way, the business application module 446 may interact with a business rules data store 426. For example, the business applications module 446 may identify a preferred customer from an Internet protocol (IP) address by associating the IP address with IP addresses stored in a portion of the business rules data store 426. As an additional example, the business applications module 446 may be used with the technology to provide customized advertising of virtualized instances and services.

Other modules and/or data stores may also be included with the computing device 412 or additional functionality may be incorporated into the modules and/or data stores heretofore described. For instance, a feedback module and/or data store may be used to determine which types of virtualized instances customers are looking for most frequently. A new class of virtualized instances may be created if customers seem to have a desire for certain specifications that are not currently being offered as a virtual machine instance to customers.

The functionality of the system 400, and other functionality described herein, may be embodied on a non-transitory machine readable storage medium having a plurality of instructions adapted to be executed to implement the aforementioned functionality.

The network 402*b* may include any useful computing network, including an intranet, the Internet, a local area network (LAN), a wide area network (WAN), a wireless data network, or any other such network or combination thereof, and may utilize a variety of protocols for transmission thereon, including for example, Internet Protocol (IP), the transmission control protocol (TCP), customer datagram protocol (UDP) and other networking protocols. Components utilized for such a system may depend at least in part upon the type of network and/or environment selected. Communication over the network may be enabled by wired or wireless connections and combinations thereof.

The client device 460 may be an example of a client running a browser 462. Moreover, client applications (e.g., a web application) may run within the browser 462 and the client device 460 may have a display 464 for displaying pages rendered within the browser 462 to interface with the customer.

Based on the aforementioned parameters, the client device 460 may be a device such as, but not limited to, a desktop computer, a laptop, a tablet, a mobile device, a television, a cell phone, a smart phone, a hand held messaging device, a set-top box, a gaming console, a custom data assistant, an electronic book reader, heads up display (HUD) glasses, a car navigation system, or any device with a display that may receive and present the information.

The computing device 412 may comprise, for example, a server computer or any other system providing computing capability. Alternatively, a plurality of computing devices 412 may be employed that are arranged, for example, in one or more server banks or computer banks or other arrangements. For purposes of convenience, the computing device 412 may be referred to in the singular, but it is understood that a plurality of computing devices 412 may be employed in various arrangements as described above.

Various processes and/or other functionality, as discussed herein, may be executed in the system 400 according to various examples. The computing device 412, may for example, provide some central server processing services while the client device 460 may provide local processing services and interface processing services to interface with the services of the computing device 412. Therefore, it is envisioned that processing services, as discussed herein, may be centrally hosted functionality or a service application that may receive requests and provide output to other services or customer devices.

For example, services may be considered on-demand computing that is hosted in a server, cloud, grid, or cluster computing system. An application program interface (API) may be provided for each service to enable a second service to send requests to and receive output from the first service. Such APIs may also allow third parties to interface with the service and make requests and receive output from the service. Like the various processing capabilities on the client device 460, a processor 414 may provide processing instructions by communicating with a memory 416 on the computing device 412. That is, the memory device may include instructions operable to be executed by the processor to perform a set of actions. The processor 414 and/or the memory 416 may directly or indirectly communicate with a data store 418.

Various data may be stored in the data store 418 that is accessible to the computing device 412. The term "data store" may refer to any device or combination of devices capable of storing, accessing, organizing and/or retrieving data, which may include any combination and number of data servers, relational databases, object oriented databases, cloud storage systems, data storage devices, data warehouses, flat files and data storage configuration in any centralized, distributed, or clustered environment. The storage system components of the data store 418 may include storage systems such as a SAN (Storage Area Network), cloud storage network, volatile or non-volatile RAM, optical media, or hard-drive type media. The data store 418 may be representative of a plurality of data stores 418.

Figure 5:
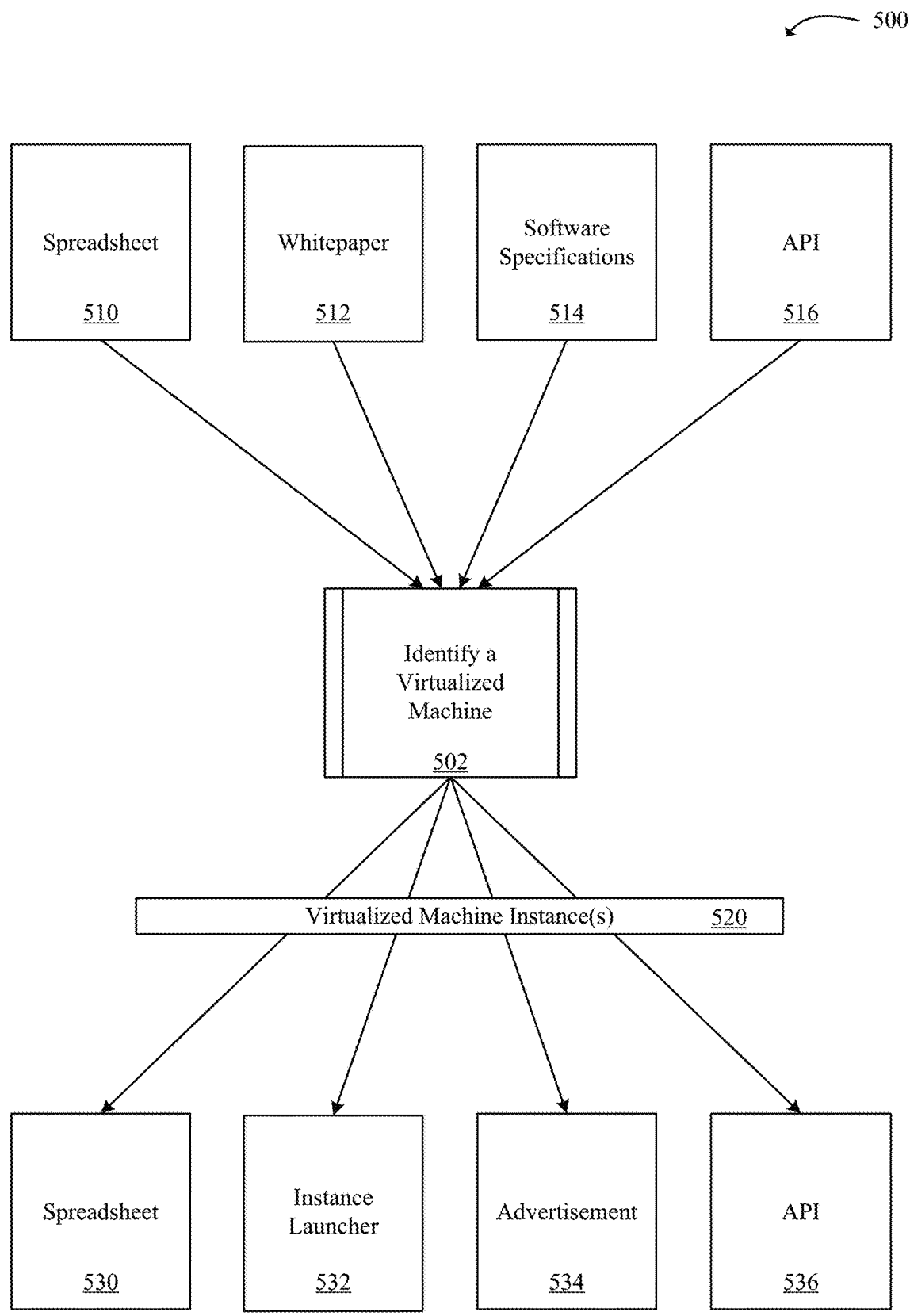
FIG. 5 is a high level schematic overview illustrating an example of a virtualized instance selection method.

With the system 400 in mind, FIG. 5 is a high level schematic overview illustrating an example of a virtualized instance selection method 500. In particular, the virtualized instance selection method may take various inputs describing machine specifications. For instance, a spreadsheet 510 may be provided as input that lists computer hardware or computer software for a group of computing configurations. This may be useful, for instance, to large organizations that may be considering moving some of their resources to a hosted virtualized computing architecture.

Other examples of inputs depicted in the virtualized instance selection method 500, include a white paper 512, a software specification document 514 or an application programming interface (API) input 516. The software specification 514 may be a document that contains minimum or ideal requirements for running a piece of software. By submitting the software specification document 514, the virtualized instance selection method 500 may be able to identify an appropriate virtualized instance to run the piece of software.

The white paper 512 may be used, for example, to describe an optimized system for a given task. When the white paper 512 is submitted, the white paper 512 may be parsed for hardware requirements and related capacity ratios, for instance. A database management system, as one example, may be scaled up or down depending on usage of the database being managed thereon. Thus, the white paper 512 may specify a computing specification in instances where usage is quite heavy and perhaps a very different computing specification where usage is medium or low. Indeed, some database management systems may introduce hardware benchmarks in whitepapers that relate to usage of the database management system. This type of information may be useful in identifying 502 at least one virtualized instance type for the database management system.

After identifying 502 a virtualized instance type, one or more virtualized instances 520 may be provided as a result. The virtualized instances 520 may be identified in one of several forms including a spreadsheet 530, an instance launcher 532, an advertisement 534, an API output 536 and/or any other type of useful result type informing the customer of the virtualized instance type that is recommended.

The spreadsheet 530, in particular, may be a useful format for the virtualized instance 520 result where the spreadsheet 510 is used as the input. As an example, a customer may provide a cost estimate spreadsheet from a computer vendor. Using the results of the virtualized instance selection method 500, the customer may be able to compare the prices from the computer vendor with the cost of using virtualized instances 520. Thus, the spreadsheet 530 may make for easy comparison with the inputted spreadsheet 510.

The instance launcher 532 may enable quick launching of an instance after having identified the virtual machine. In this way, the customer may quickly move from evaluating whether to use the virtualized instance to actually using the virtualized instance. Similarly the advertisement 534 may be used to advertise the virtual machine instance. Such an advertisement may be placed on computer vendor sites, for instance, as a way for consumers to compare a hosted virtualized instance service with machine specifications being sold on various sites. Indeed, such an advertisement may include identifying the computer description within a page on the site and generating a directed advertisement. As another example an advertisement may be placed on a page that contains software specifications such as the input depicted by 514.

Figure 6:
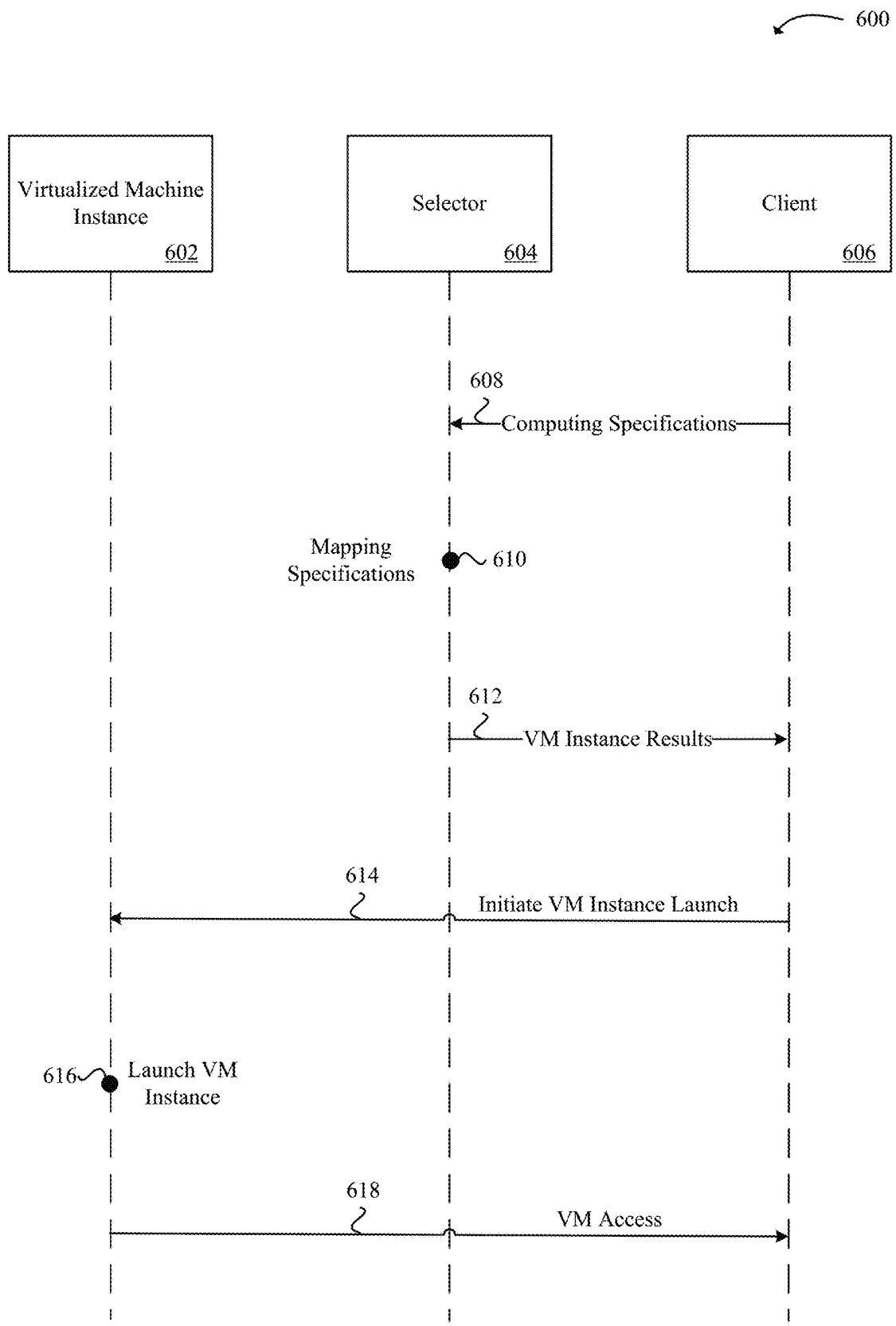
FIG. 6 is a sequence chart illustrating an example virtualized instance selection method.

FIG. 6 is a sequence chart 600 illustrating an example virtualized instance selection method. The sequence chart 600 includes a virtualized instance 602, a selector 604 and a client 606 used by a customer. The client 606 may begin by providing a set machine specifications 608 to the selector 604. The computing specification may be provided in either a structured or unstructured fashion to the selector 604. If desired, the selector 604 may use natural language processing to structure the computing specification.

The selector 604 may then map the computing specification 608 to the specifications of a virtualized instance to create mapping specifications 610 and provide the virtualized instance as a result 612. The mapping may include preset mapping of a computer make and model to specifications of the virtualized instance, or the mapping may proceed on a component-by-component basis. Additionally, mapping the computing specification may include selecting the virtualized instance with a least cost and specifications that surpass the computing specification, or may include selecting the virtualized instance with specifications that are within a pre-determined range of the computing specification.

In this example, the customer may initiate the virtualized instance launch 614 by instructing virtualized computing environment to launch the virtualized instance 602. The virtualized instance 602 may then be launched as indicated by 616. Further, the virtualized instance 602 may then provide access as indicated by 618.

Figure 7:
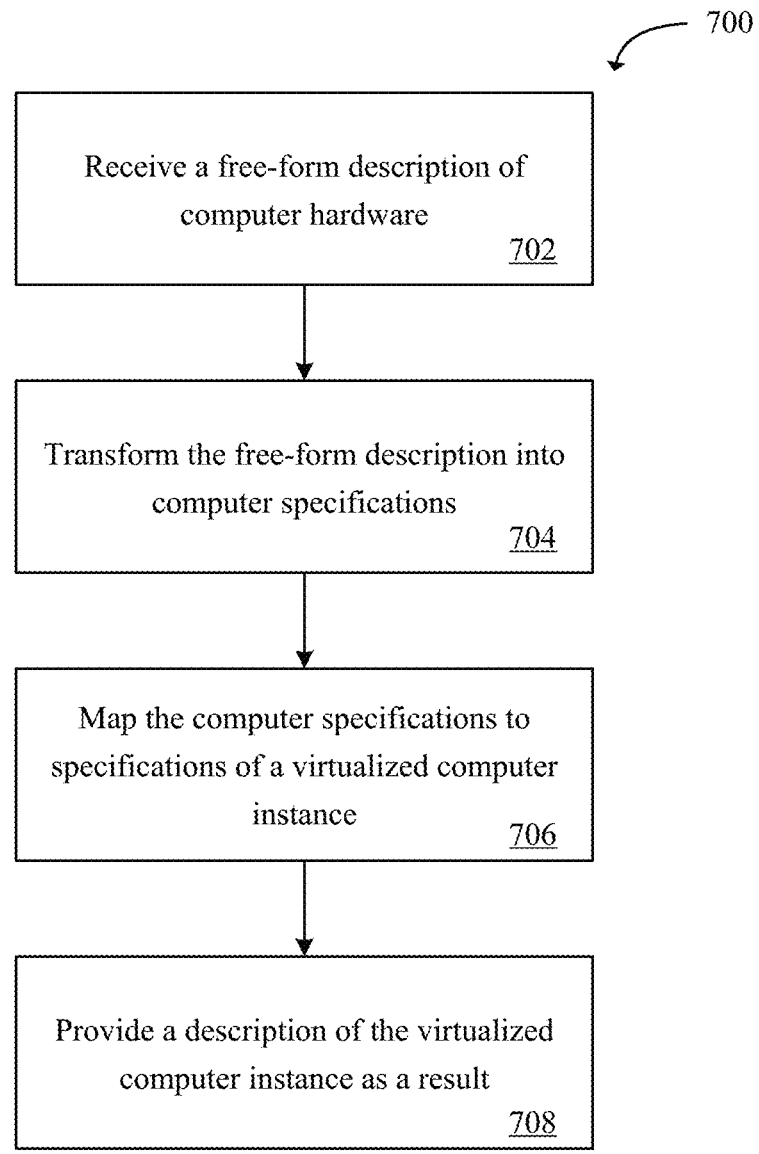
FIG. 7 is a flowchart illustrating an example method to identify a virtualized computer instance using a free-form description.

FIG. 7 is a flowchart illustrating an example method 700 to identify a virtualized computer instance. The method 700 may include receiving a free-form description of computer hardware as shown in method element 702. For example, an interface may provide a text box to enter for free-form description. The free-form description may be provided through a text box on a page and may be delivered over a hypertext transfer protocol (HTTP) connection, as one example.

The method 700 may also include transforming the free-form description into computer specifications as shown in method element 704. This transformation may take place, for example, through parsing the free-form text, applying regular expression matching, or through any sort of natural language processing technique.

Additionally, the computer specifications may be mapped to specifications of a virtualized computer instance as shown in method element 706. The computer specifications may be mapped on a component-by-component basis, as one example. Thus the technology may allow customers to resolve known computing resources to more abstracted labels for utility-oriented computing resources. The method 700 may further include providing a description of the virtualized computer instance as a result as shown in method element 708. This may allow customers to resolve known computing resources to more abstracted labels that might be used for virtualized computer instances.

Figure 8:
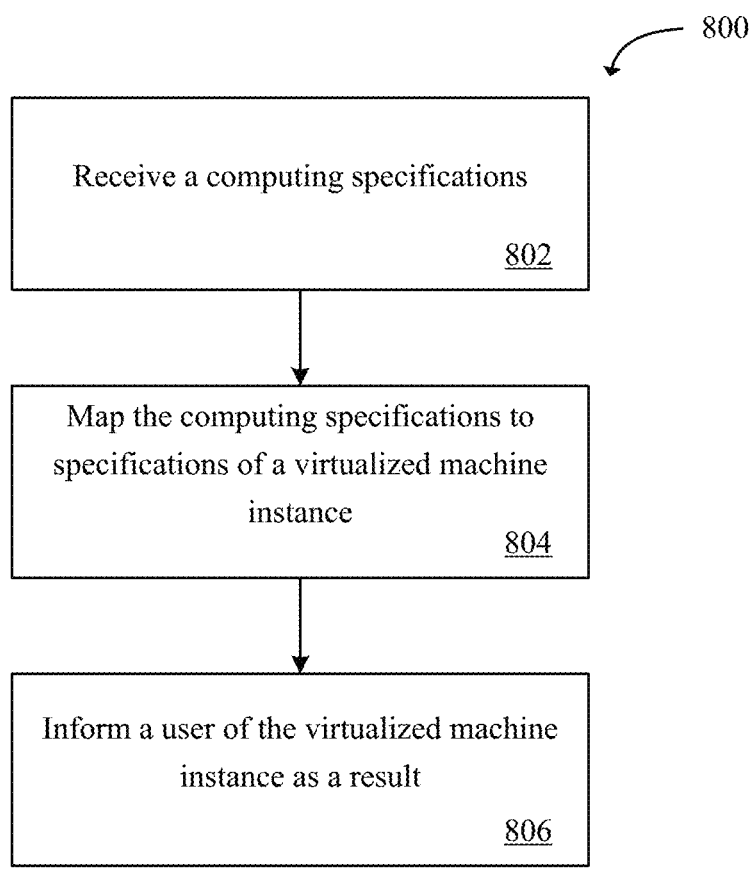
FIG. 8 is a flowchart illustrating an example method to select a virtualized instance.

FIG. 8 is a flowchart illustrating an example method 800 to select a virtualized instance. The method 800 may include receiving a computing specification as shown in method element 802. The computing specification may include things such as manufacturer and model, or various hardware component specifications such as the amount of memory, the CPU and processing speed, the amount of storage available or various input/output (I/O) specifications.

The method 800 may also include mapping the computing specification to specifications of a virtualized instance as shown in method element 804, and informing a customer of the virtualized instance as a result as shown in method element 806. This technology is may allow a customer to more easily select virtualized instances that fit the customer's needs. A customer may more easily evaluate how a virtualized might compare with a physical machine.

Figure 9:
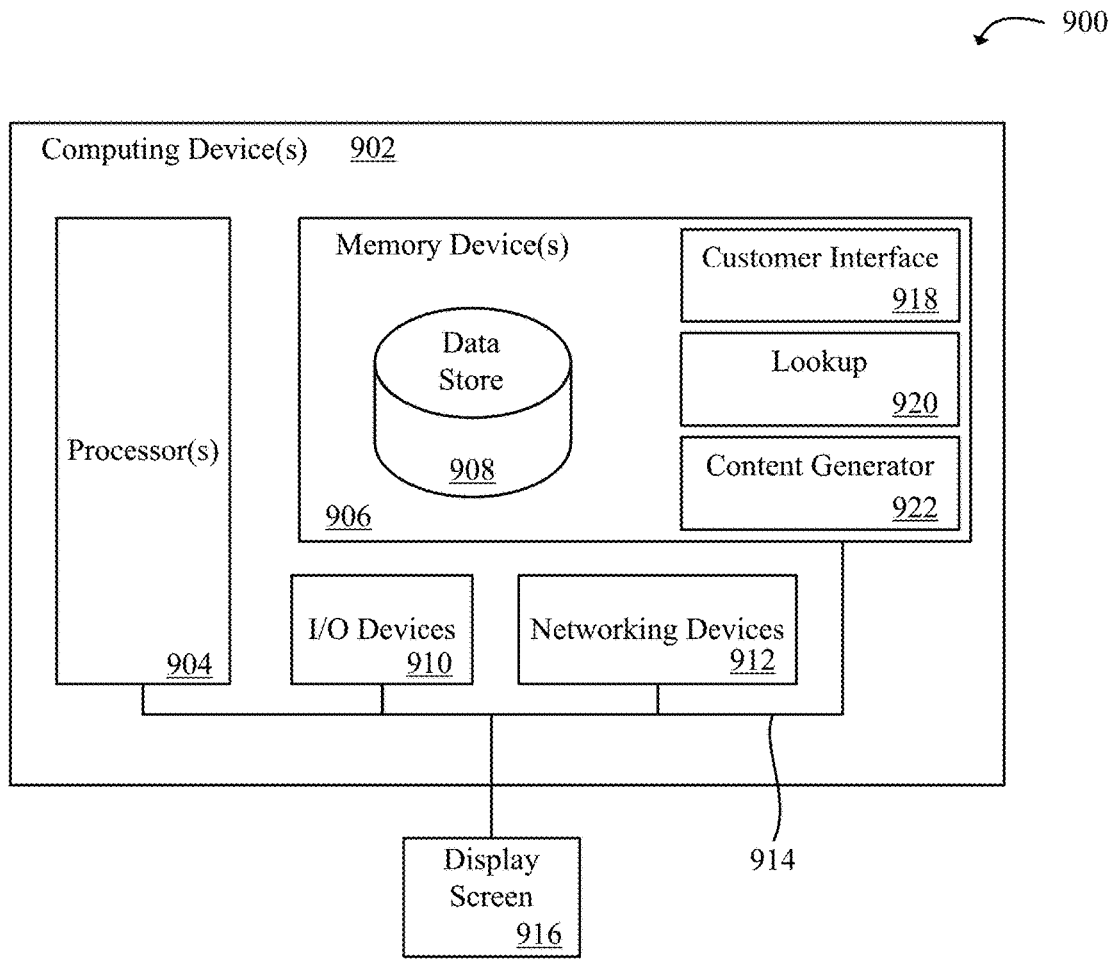
FIG. 9 is block diagram illustrating an example of a computing device that may be used for virtualized instance selection.

FIG. 9 is block diagram 900 illustrating an example of a computing device 902 that may be used for virtualized instance selection. In particular, the computing device 902 illustrates a high level example of a device on which modules of the disclosed technology may be executed. The computing device 902 may include one or more processors 904 that are in communication with memory devices 906. The computing device 902 may include a local communication interface 914 for the components in the computing device. For example, the local communication interface 914 may be a local data bus and/or any related address or control busses as may be desired.

The computing device 902, for instance, may be used to select a virtualized instance. For example, the computing device 902 may be used to receive a set of machine specification. The computing device 902 may map the computing specification to specifications of a virtualized instance. The computing device 902 may then inform a customer of the virtualized instance as a result.

In particular, the memory device 906 may contain modules that are executable by the processor(s) 904 and data for the modules. Located in the memory device 906 are modules executable by the processor. For example, a customer interface module 918, a lookup module 920, a content generator module 922 and other modules may be located in the memory device 906. The modules may execute the functions described earlier. For instance, the customer interface module 918 may be used as an interface to input a computing specification. The lookup module 920 may perform a table lookup to map the computing specification to a virtualized instance by looking up the virtualized instance using the computing specification. The content generator module 922 may provide a description of the virtualized instance as a result of the computing specification received.

A data store 908 may also be located in the memory device 906 for storing data related to the modules and other applications along with an operating system that is executable by the processor(s) 904.

Other applications may also be stored in the memory device 906 and may be executable by the processor(s) 904. Components or modules discussed in this description that may be implemented in the form of software using high programming level languages that are compiled, interpreted or executed using a hybrid of the methods.

The computing device may also have access to I/O (input/output) devices 910 that are usable by the computing devices. An example of an I/O device is a display screen 916 that is available to display output from the computing devices. Other known I/O devices may be used with the computing device as desired. Networking devices 912 and similar communication devices may be included in the computing device. The networking devices 912 may be wired or wireless networking devices that connect to the internet, a LAN, WAN, or other computing network.

The components or modules that are shown as being stored in the memory device 906 may be executed by the processor(s) 904. The term "executable" may mean a program file that is in a form that may be executed by a processor 904. For example, a program in a higher level language may be compiled into machine code in a format that may be loaded into a random access portion of the memory device 906 and executed by the processor 904, or source code may be loaded by another executable program and interpreted to generate instructions in a random access portion of the memory to be executed by a processor. The executable program may be stored in any portion or component of the memory device 906. For example, the memory device 906 may be random access memory (RAM), read only memory (ROM), flash memory, a solid state drive, memory card, a hard drive, optical disk, floppy disk, magnetic tape, or any other memory components.

The processor 904 may represent multiple processors and the memory device 906 may represent multiple memory units that operate in parallel to the processing circuits. This may provide parallel processing channels for the processes and data in the system. The local interface 914 may be used as a network to facilitate communication between any of the multiple processors and multiple memories. The local interface 914 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method to identify a virtualized computer instance, comprising:
    under control of one or more computer systems configured with executable instructions:
        receiving a free-form description of computer hardware, wherein a portion of the free-form description is related to a make or model of physical computer hardware;
        transforming the free-form description into computing specifications via applying expression matching to portions of the free-form description to identify components of the computer hardware;
        mapping the computing specifications to specifications of a virtualized computer instance by matching the components of the computer hardware to components of the virtualized computer instance; and
        providing a description of the virtualized computer instance as a result.

2. The method of claim 1, wherein transforming the free-form description further comprises parsing the free-form description into computing specifications.

3. The method of claim 1, further comprising identifying a computer description within a page and generating a directed advertisement using the result.

4. The method of claim 3, further comprising providing a link to launch the virtualized computer instance.

5. A method to select a virtualized instance, comprising:
    under control of one or more computer systems configured with executable instructions:
        receiving a computing specification, wherein a portion of the computing specification is a description related to a make or model of physical computer hardware;
        mapping the computing specification to specifications of a virtualized instance by applying expression matching to portions of the computing specification to identify components of the computing specification wherein the mapping matches the components of the computing specification to components of the virtualized instance; and
        providing information about the virtualized instance as a result.

6. The method of claim 5, further comprising parsing a free-form description of a machine into the computing specification.

7. The method of claim 6, wherein the free-form description is a uniform resource locator (URL) that contains the free-form description of the machine.

8. The method of claim 5, wherein the computing specification is gathered using structured input.

9. The method of claim 5, wherein the computing specification is provided as part of a specification spreadsheet that lists a plurality of machine descriptions.

10. The method of claim 5, wherein mapping the computing specification includes a preset mapping of a computer make and model to specifications of the virtualized instance.

11. The method of claim 5, wherein mapping the computing specification includes selecting the virtualized instance with a least cost and specifications that surpass the computing specification.

12. The method of claim 5, wherein mapping the computing specification includes selecting the virtualized instance with specifications that are within a pre-determined range of the computing specification.

13. The method of claim 5, wherein the computing specification software.

14. The method of claim 5, wherein the computing specification includes at least one of a processor architecture, a processor speed, an amount of processors, an amount of memory, an amount of storage space, or a network input/output (I/O) performance.

15. The method of claim 14, wherein specifications of the virtualized instance include at least one of a virtualized processor architecture, an amount of virtualized compute units, an amount of virtualized processors, an amount of virtualized memory, an amount of virtualized storage space, or a virtualized network input/output (I/O) performance.

16. The method of claim 5, further comprising providing a cost calculator for the virtualized instance.

17. The method of claim 5, further comprising providing a link to launch the virtualized instance.

18. The method of claim 5, wherein receiving the computing specification includes communicating with a browser plug-in that is capable of identifying the computing specification within a page.

19. A system to select a virtualized instance, comprising:
    a processor;
    a memory device having instructions stored in the memory device, the instructions being executable by the processor, the instructions comprising:

an interface to input a computing specification, wherein a portion of the computing specification is a description related to a make or model of physical computer hardware;

a parser to apply expression matching to portions of the computing specification to identify components of the computing specification;

a table lookup to map the computing specification to a virtualized instance by looking up the virtualized instance using the computing specification and by matching the components of the computing specification to components of the virtualized instance; and a content generator to provide a description of the virtualized instance as a result of the computing specification received.

20. The system of claim 19, wherein the parser is to parse a free-form description of a machine into the computing specification.

21. The system of claim 19, further comprising a page analyzer to identify the computing specification within a page.

22. The system of claim 19, further comprising an instance launcher to provide a link to launch the virtualized instance.

* * * * *